United States Patent
Pickler et al.

(10) Patent No.: US 7,727,377 B2
(45) Date of Patent: Jun. 1, 2010

(54) SYSTEM AND PROCESS FOR THE TREATMENT OF MULTIPHASE RESIDUES

(75) Inventors: Arilza de Castilho Pickler, Rio de Janeiro (BR); Luis Fernando Piexoto Gallo, Rio de Janeiro (BR); Carlos Alberto Dias da Silva, Rio de Janeiro (BR); Waldir Albrecht, Joinville (BR); Christine Albrecht Althoff, Joinville (BR)

(73) Assignees: Petroleo Brasileiro S.A. - Petrobras, Rio de Janeiro (BR); Albrecht Equipamentos Industrials LTDA, Joinville (BR)

( * ) Notice: Subject to any disclaimer, the term of this patent is extended or adjusted under 35 U.S.C. 154(b) by 723 days.

(21) Appl. No.: 11/074,748

(22) Filed: Mar. 9, 2005

(65) Prior Publication Data
US 2005/0218037 A1   Oct. 6, 2005

(30) Foreign Application Priority Data
Mar. 19, 2004   (BR)   .................................... 0400305

(51) Int. Cl.
- C10B 57/02   (2006.01)
- C11B 1/00   (2006.01)
- C02F 1/68   (2006.01)
- C10G 1/00   (2006.01)
- F28D 21/00   (2006.01)

(52) U.S. Cl. ........................... 208/49; 208/13; 208/407; 208/117; 554/17; 210/761; 210/762; 422/204

(58) Field of Classification Search .................. 208/13, 208/49, 407, 117; 554/177, 17; 210/762, 210/761; 422/204
See application file for complete search history.

(56) References Cited

U.S. PATENT DOCUMENTS

| | | | |
|---|---|---|---|
| 3,917,564 A | | 11/1975 | Meyers |
| 4,126,519 A | * | 11/1978 | Murray .......................... 201/32 |
| 4,308,103 A | * | 12/1981 | Rotter .......................... 202/117 |

(Continued)

*Primary Examiner*—Walter D Griffin
*Assistant Examiner*—Natasha Young
(74) *Attorney, Agent, or Firm*—Sughrue Mion, PLLC

(57) ABSTRACT

A system 100 is described for the treatment of multiphase residues having unlimited content of water, oil and solids to obtain hydrocarbons and other products, said system comprising multiphase residue feed system 10, inert gas system 20 and reduced pressure system 30, tubular reactor 40 provided with three heating zones Z-1, Z-2 and Z-3 with a temperature gradient and transportation helicoid 42 to displace the residue mass throughout the reaction zones, the hydrocarbon products and water being collected in a system 60 of condensers 61, 62 and 63 linked to a system 70 of bubbling vessels 71, 72 and 73, reactor 40 being operated in the sealed mode and being provided with a multiphase residue inlet 43 and exit 44 of solid product. The solid product is collected in a system 50 comprising upper valve 51 and lower valve 52, and intermediate silo 53 and then directed to post-treatment system 90 for activation aiming at industrial utilization. The process using the system 100 of the invention is also described. Multiphase organic residues, petroleum residues, pure or in admixture in any amount, from chemical and pharmaceutical industries, paper and pulp industry, and mining industries can be processed in the inventive system. Besides, it is possible to recover phenols from foundry sands in the system and process described.

24 Claims, 2 Drawing Sheets

U.S. PATENT DOCUMENTS

| | | | |
|---|---|---|---|
| 4,342,639 A * | 8/1982 | Gagon ........................ 208/390 |
| 4,618,735 A | 10/1986 | Birdle et al. |
| 4,781,796 A | 11/1988 | Birdle et al. |
| 4,983,278 A * | 1/1991 | Cha et al. ................... 208/407 |
| 4,985,131 A | 1/1991 | Lane |
| 5,223,152 A | 6/1993 | Freymeyer et al. |
| 5,230,211 A * | 7/1993 | McMahon et al. ............ 60/781 |
| 5,451,297 A * | 9/1995 | Roy ............................ 201/25 |
| 5,847,248 A | 12/1998 | Birdle et al. |
| 5,865,956 A | 2/1999 | Birdle et al. |
| 5,922,189 A | 7/1999 | Santos |

* cited by examiner

US 7,727,377 B2

SYSTEM AND PROCESS FOR THE TREATMENT OF MULTIPHASE RESIDUES

FIELD OF THE INVENTION

The present invention relates to a system for the treatment of multiphase residues. More specifically, the present invention relates to a system for treating multiphase residues having an unlimited content of water, oil and solids, for obtaining hydrocarbons and other useful products. The system comprises a tubular reactor where the residue is heated under reduced pressure and in the presence of an inert gas, the heating being effected in distinct temperature zones with a first evaporation zone for evaporating free and emulsified water and elution of light hydrocarbons, a second zone of thermal desorption and a third zone of mild pyrolysis. The products of each zone are eluted towards condensers. The reactor bottom is provided with an access for raw material and another one for collecting the resulting solids from the process. The invention relates further to the continuous process for the treatment of multiphase residues with the aid of the proposed system aiming at obtaining hydrocarbons and other products.

BACKGROUND INFORMATION

Residues or wastes from a petroleum refinery are dispersions of oil and water where variable amounts of these two immiscible liquids are stabilized by finely divided solids such as sand, slime, high carbon content fuels, etc. Such dispersions are not easily susceptible to be broken by the usual techniques. Those and other residues have been the object of several discarding techniques at considerable costs. Incineration is an expensive process requiring highly costly, sophisticated equipment. Landfarming is a technique where the slow bacterial action leads to the final discarding.

U.S. Pat. No. 3,917,564 teaches mixing a petroleum residue containing solids and water (what is known as sludge) and using the so-obtained mixture to quickly quench the coke in the delayed coking process. The technique taught in this U.S. patent is designed to the production of fuel grade coke.

U.S. Pat. No. 5,223,152 teaches that waste streams containing oil, water, high molecular weight fractions, green waxes, coke fines and other solids are produced during the refining of petroleum. These waste streams are generated as a result of the refinery process itself, cleaning processes, maintenance and other such occurrences. It is highly desirable to recover, to the extent possible, the valuable products contained in these waste streams, not only for realizing the value of the products recovered but for minimizing the amount of waste, which must be extensively treated to allow for disposal in an environmentally acceptable manner.

Normally, refinery waste streams are collected and sent to an API separator for initial processing. At the API separator, gravity separates the refinery waste into three layers, a primarily-solids or sludge layer at the bottom, a primarily-water layer in the middle and a primarily-oil layer at the top. The primarily oil layer is skimmed from the top of the API separator and collected in a large surge tank for eventual reprocessing to recover valuable products. The recovered oil or slop oil from this primarily-oil layer is typically composed of 80 to 90 weight percent oil with the remainder being water. Some entrained solids, such as green waxes and coke fines, may be present in the recovered oil but would usually be at very low levels.

Recovered oil normally contains a wide boiling range of hydrocarbon materials. Thus, reprocessing of recovered oil is typically carried out by feeding the recovered oil to a fractionator or distillation column to separate out the various products. For refineries that contain a delayed coker unit it is usually the coker fractionator that is used to fractionate the recovered oil. Conventionally, a recovered oil stream is pumped from tankage through a preheater and then fed to the bottom of the coker fractionator.

However, the re-processing of recovered oil presents operation problems. This is due to the water content of the recovered oil. When water that has been dispersed and stabilized in the oil by the action of the high molecular weight fractions is heated through indirect heat exchange with a warmer product stream or process steam and fed to a fractionator, the water vaporizes. As the water vaporizes it expands with a significant increase in volume. The force associated with this expansion causes pressure surges which can severely damage equipment and severely upset operation of the fractionator.

Such upsets can lead to contamination of the lighter product streams from the fractionator. Heavy boiling range components can be carried up the tower thereby contaminating these product streams. These contaminations then cascade into downstream process units resulting in further contaminations.

U.S. Pat. No. 4,985,131 teaches a process for treating refinery sludge to produce petroleum coke. In the described process, the sludge feed is dried and heated and the light hydrocarbons and coke residue are separated.

U.S. Pat. No. 5,922,189 teaches a process for the refining of petroleum residues and sludge generated by the oil producers, refiners and re-refiners that comprises the steps of heating under vacuum the petroleum residues and sludge by injecting steam or inert gas or both up to a temperature in the range of 360° C. and up to 538° C. and keeping the mixture at that temperature for a short residence time between 1 and up to 6 hours, while vacuum and aspersion are carried out to produce asphalt. Volatile products are condensed to yield fuel; wax oil and can be further processed to yield refined fuel, wax and dewaxed oil. The obtained product is an asphalt, in a reduced time process and without using propane-based distillation processes. However, this U.S. patent does not contemplate the processing of multiphase residues, mainly those residues having high water content, nor the use of a reactor having a gradient of heating, at various temperatures, with collectors and scrubbers for the several kinds of collected gaseous products. This U.S. patent envisages a continuous inert gas feed, while in the present system and process the inert gas is added in the beginning of the operation to create an inert atmosphere, that is later on kept inert by gas generated by the process itself.

On the other hand, U.S. Pat. Nos. 4,618,735, 4,781,796, 5,865,956 and 5,847,248 are directed to they conversion of municipal wastes for producing gaseous and liquid hydrocarbon products in the absence of oxygen, basically using low-temperature conversion processes or LTC. Such processes are based on the processing of a dry feed of municipal wastes or other residues, this rendering not viable the application of such technology to the situation of petroleum residues or from other sources having unlimited contents of water, oil and solids.

Thus, in spite of the approaches envisaged by the technique, there is still the need of a system for treating multiphase residues having an unlimited content of water, oil and solids aiming at obtaining hydrocarbon fractions and other useful products, said system comprising a tubular reactor provided with a fixed pitch screw conveyor where the multiphase residue is heated under reduced pressure and in the presence of an inert gas, the heating being carried out in distinct temperature zones with a first zone of evaporation of free and emulsified water and elution of light hydrocarbons, a second zone of thermal desorption and a third zone of mild pyrolysis, the various hydrocarbons fractions being collected in condensers while the solids are separated for post-treatment and industrial use, such system and associated treatment process being described and claimed in the present application.

SUMMARY OF THE INVENTION

Broadly, the present invention relates to a system for treating a multiphase residue having an unlimited content of water, oil and solids for obtaining hydrocarbons and other useful products, wherein such system comprises:

a) A system for feeding multiphase residue that displaces in a controlled way said residue towards the interior of a reactor kept under an inert atmosphere and reduced pressure;

b) a tubular reactor made up of a refractory steel sleeve and provided with a fixed pitch screw conveyor, three independent sets of heating devices being mounted around said sleeve so as to form reaction zones Z-1, Z-2 and Z-3 with a temperature gradient, the upper part of said reactor being provided with three outlets for the produced condensable gases while the lower part is provided with an inlet for introducing residue feed and an exit for collection of solids produced in the process, said reactor working in the sealed mode;

c) a system for collecting the produced solids, said system being made up of valves and an intermediate silo;

d) three condensers for collecting water and light hydrocarbons emerging from each of the Z-1, Z-2, Z-3 zones of said reactor, also under reduced pressure, said condensers being connected to scrubbers;

e) scrubbers made up of recipients containing chemical reagents and dispersants designed to wash the non-condensable gases; and f) a system for the operation control and monitoring of the process conditions.

According to the proposed system, the residue feed is introduced into the reactor kept under negative pressure and inert atmosphere, the residue being then displaced along the tubular reactor screw conveyor, the different zones are successively heated and the produced condensable gases are independently collected in condensers connected to scrubbers for trapping contaminants or specific products.

The solid residue is collected and further processed aiming at other industrial uses.

The residual aqueous phase containing valuable products collected in the condensers and scrubbers is treated aiming at the best use of such products.

And the process for treating a multiphase residue containing unlimited contents of water, oil and solids aiming at obtaining hydrocarbons and other useful products comprises injecting in a tubular reactor, in a controlled way, and with the aid of a positive displacement pump, while keeping a vertical column filled so as to keep the pressure at a reduced level, a multiphase residue feed having an unlimited content of water, oil and solids, said feed being submitted in the reactor to three distinct heating zones, a first zone from 80° C. on, evaporating water and light hydrocarbons eluted to condensers, a second zone from 180° C. on, where thermal desorption is carried out, and a third, mild pyrolysis zone from 250° C. on causing partial conversion of the heavier fraction into compounds of lower molecular weight, also vaporized and eluted to the corresponding condenser.

The solid collection system comprises two valves and an intermediate system to keep inert the atmosphere in contact with the reactor interior.

The process involves further directing the eluted gases to a set of scrubbers containing chemical reagents and dispersants to trap through chemical reaction and in a selective way the contaminants or specific compounds. A flare burns the excess gases not absorbed in the scrubbers.

Thus, the invention provides a system for treating multiphase residues having unlimited content of water, oil and solids for obtaining hydrocarbons and other useful products that comprises a tubular reactor provided with a screw conveyor and kept under an inert atmosphere and reduced pressure, said reactor being provided with three independent heating zones with separate collection of the liquid products resulting from the process, and collection of the produced solid.

The invention further provides a process for treating multiphase residues having an unlimited contend of water, oil and solids for obtaining hydrocarbons and other products using the described system.

The invention provides still a system and process useful for the treatment of multiphase residues originated in the petroleum industry, municipal waste, leather treatment industry, slaughterhouses, food industry, paper and pulp industry, mining, foundry sands for phenol recovery, chemical and pharmaceutical industries aiming at obtaining hydrocarbons and solid products.

The invention provides still an environmentally friendly system since it is able to process multiphase residues such as municipal waste, petroleum and other residues, pure or in admixture in any amount, so as to obtain useful hydrocarbons and solids, while the useful substances present in the water recovered from the treated residue are equally utilized.

DETAILED DESCRIPTION OF THE PREFERRED MODES

One aspect of the invention is a system for treating multiphase residues having an unlimited content of water, oil and solids.

Multiphase residues having an unlimited content of water, oil and solids susceptible to be treated by the system and process of the invention comprise:
 municipal waste having at least 15% w/w solids;
 industrial residues from leather factories and slaughterhouses;
 petroleum residues such tank bottoms, process vessels, API Box and petroleum spills on sea water or land;
 mixture in any amount of organic residues and petroleum residues;
 dredging residues from bay bottoms and landfarms;
 muds from biological treatments;
 used tires;

paper and pulp industry residues;
mining residues;
chemical and pharmaceutical industry residues;
phenol recovery from foundry sands.

Figure 1:
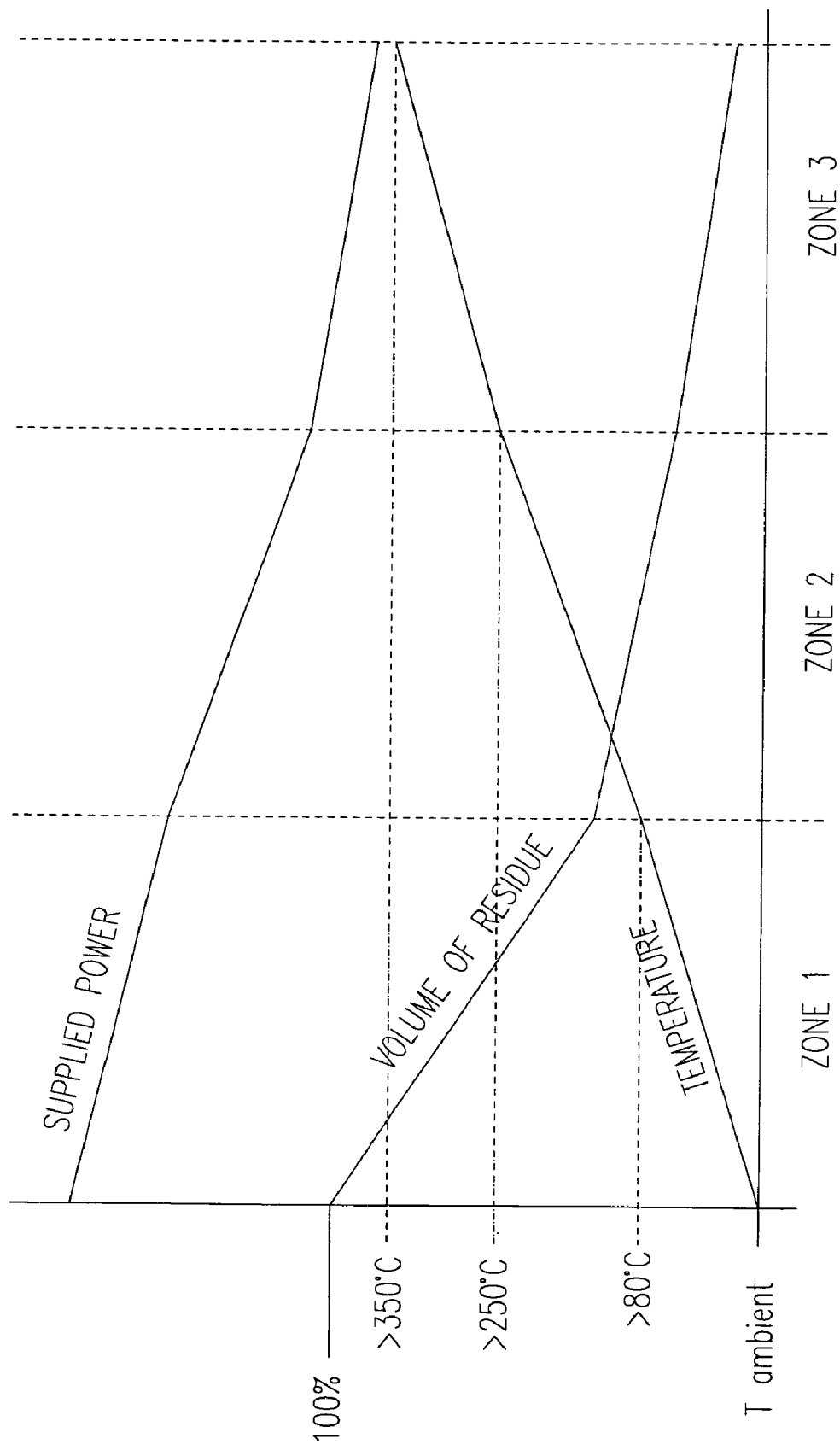
FIG. 1 attached is a graph that illustrates the evolution of the adsorbed power, residue feed volume and reaction temperature throughout the reactor 1, 2 and 3 zones vs. the reactor internal temperature.

FIG. 1 is a schematic flowsheet of the behavior of the mass fluxes involved in the inventive system. It can be seen how the initial feed volume in Zone 1 requires a certain absorbed power, which diminishes in the following zone as a function of the volume variations and of the temperature gradient applied.

Figure 2:
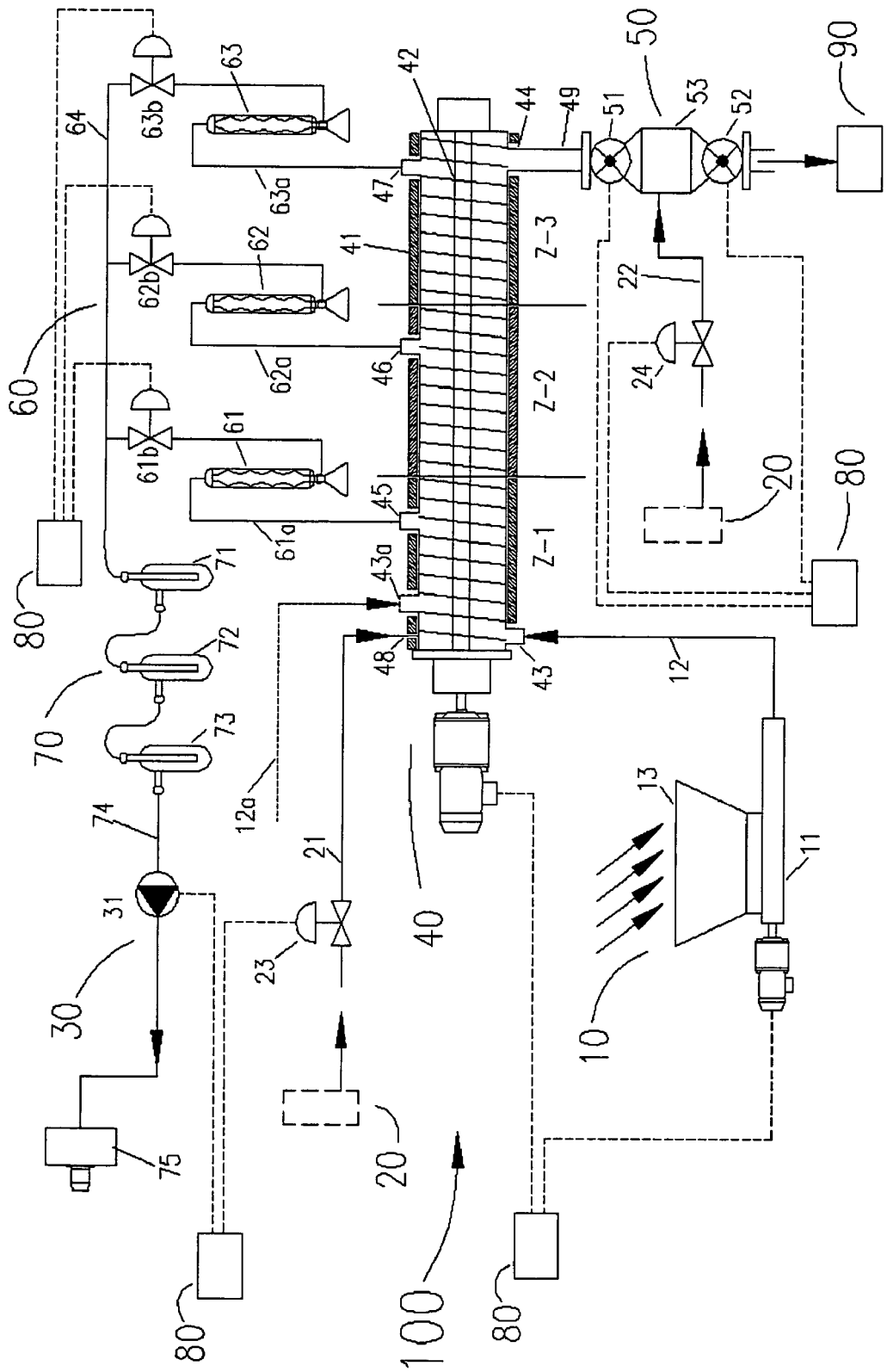
FIG. 2 attached is a schematic flowsheet of the system of the invention for the treatment of multiphase residues having an unlimited amount of water, oil and solid residue.

FIG. 2 illustrates the inventive system, generally designed by numeral 100, such system comprising residue feed system 10, inert gas feed system 20, reduced pressure system 30, tubular reactor 40 provided with heating, solids discharge sealed system 50, gas condensation system 60, scrubbers 70 for trapping specific compounds, control system 80 and solid product post treatment system 90.

The several systems encompassed by system 100 of the invention will be detailed below with reference to FIG. 2.

Residue feed system 10 is made up of a positive displacement pump 11 designed to displace the multiphase residue in a controlled way towards the interior of the tubular reactor 40 via a line 12, while a vertical column is at all times maintained filled in so as to work as a vacuum seal. The residue is introduced in tubular reactor 40 via inlet 43. Pump 11 is adapted to a hopper 13 that receives the multiphase residue. The feed system 10 is linked to control system 80 that allows to increase or reduce the flow rate of multiphase residue to the tubular reactor 40.

It is preferred to use the feed in comminuted form and homogenized so as to make easier the processing of the multiphase residue in tubular reactor 40. For non-homogeneous multiphase residues such as those from leather factories and poultry slaughterhouses, the residue can be previously milled, kneaded or crushed. Other residues such as used tires can be milled and the reinforcing metals separated before processing.

Inert gas feed 20 can be made up of argon, nitrogen or any other gas providing inertness properties. The inert gas is introduced into tubular reactor 40 via line 21 through inlet 48. Gas injection control is implemented so as not to allow that the inner system is contaminated by the environment. The flow of inert gas is introduced into tubular reactor 40 so as to render the system inert. Once made inert, the whole system is kept as such thanks to the generation of gases by the system itself, so that there is no need of continuous inert gas additions.

Vacuum system 30 is made up of a high flow rate vacuum pump, of the industrial blower kind, having the capacity to impart a depression around 400 to 1,000 mbar.

Tubular reactor 40 is made up of a refractory steel sleeve 41 and a fixed pitch screw conveyor 42 mounted on mandrels. The speed of the screw conveyor 42 is variable according to the residence time desired for each kind of residue. Controls 80 allow to adapt the speed of the helicoid 42 to the kind of multiphase residue being processed. Around the outer sleeve 41 are mounted three sets of electrical resistance Z-1 to Z-3, or any other compatible system for direct heating, where each resistance set is provided with independent control and driving. Thus, although the tubular reactor 40 is made up of a single chamber, actually it is as if there were three contiguous reactors effecting three distinct reaction processes, that is, evaporation, thermal desorption and mild pyrolysis.

For high solids content and low water content residues, the upper part of the tubular reactor 40 is provided with a residue inlet 43a.

Tubular reactor 40 works in the sealed mode. The sealing is effected by the residue columns (lines 12, 12a). The added inert gas as well as gases generated in the reaction system equally keeps the system sealed.

A distinctive feature of the inventive system when compared to state-of-the-art systems is that the present process does not contemplate gas recirculation. This prevents the need to add specific controls on the inner ambient saturation related to the contaminants and increases the safety of the whole system.

In Zone 1 the temperature starting at 80° C. allows that free water as well as water emulsified in the residue are evaporated and light hydrocarbons are eluted through exit 45 up to condenser 61 via line 61a.

In Zone 2 at controlled temperatures starting at 180° C. there is a thermal desorption process, plus molecular bond breaks. Reaction products are eluted through exit 46 up to condenser 62 via line 62a.

In Zone 3 occurs a mild pyrolysis starting at 250° C. and the heavier fraction being more concentrated in resins and asphaltenes is partially converted into lower molecular weight compounds, those being vaporized and exiting through exit 47 and also eluted towards condenser 63 via line 63a.

Each Zone generates oil having different concentrations of naphtha, LCO and Bottoms.

Reactor 40 bottom is provided with two openings, one of them inlet 43 designed for feeding the residue raw material and the other one exit 44 for collecting the solids resulting from the process.

The solids collection system 50 is connected to tubular reactor 40 via a line 49 and made up of two valves 51, 52, respectively upper and lower, inserted in a solids collecting device or silo 53, said silo having the purpose of keeping inert the atmosphere in contact with the interior of tubular reactor 40. Upper valve 51 is normally kept open, so as to expose the interior of the solids collecting device or silo 53 to the system vacuum; the lower valve 52 is kept closed so as to retain the solids.

In the collection step, which is temporized, upper valve 51 is closed, the pressure in silo 53 is increased by inert gas injection from system 20 via line 22 and lower valve 52 is then open.

The collection step is carried out under gas injection. At the end of the collection step lower valve 52 is closed, pressure is increased, upper valve 51 is then opened and a new solid collection cycle is started.

The residence time of a multiphase residue in tubular reactor 40 extends over wide ranges, depending on the content of water, oil and solids present in said residue and can vary from 40 to 120 minutes.

System 60 of condensers 61, 62 and 63 for generated gases: useful condensers are those of the tube and shell type with counter current flow of cooling fluid. Condensers 61, 62 and 63 are under vacuum and connected to exits 45, 46, 47 of tubular reactor 40 and coupled to a collecting tank (not represented), which also works as decanter.

Valves 61b, 62b and 63b are respectively the flow rate valves of the products collected in condensers 61, 62 and 63.

Condensers 61, 62 and 63 are also connected to the scrubbers 70 system via line 64.

System 70 of scrubbers 71, 72, and 73 is made up of vessels containing chemical reagents and dispersants aiming at increasing the contact surface area of the produced gas. The aim is, through a chemical reaction and in a selective way, to trap contaminant products or specific compounds.

System 70 is linked to vacuum system 30 via line 74. At the end of the gas line is placed a burner 75 fed with fuel gas or LPG to neutralize the system exit. In an industrial scale, any generated gases can be directed to industrial uses.

Chemical products and dispersants contained in scrubbers 71, 72, and 73 are usually basic, acidic or neutral solutions. Useful basic solutions are diluted amine solutions, diluted alkaline metal hydroxide solutions such sodium hydroxide solutions or potassium hydroxide solutions.

Useful acidic solutions are potassium permanganate diluted solutions in an acidic medium, mineral acid diluted solutions such as sulfuric or hydrochloric acid solutions. Alternatively, scrubbers 71, 72, and 73 can contain substances for sequestering mercury, boron or any other contaminant present in the multiphase residue.

Control system 80 is designed to control vacuum pump 31 of the vacuum system 30, the residence time in tubular reactor 40 through rotation of the screw conveyor 42, the rotation of pump 11 so as to vary the amount of introduced multiphase residue feed, valves 23 and 24 that control sealing, valves 51 and 52 and valves 61b, 62b and 63b for the flow rate of the products to be collected in condensers 61, 62 and 63. Control system 80 includes electro-electronic devices besides pneumatic devices. A SCADA or similar interface software is associated to system 80.

Post-treatment system 90 is to be applied to the solids collected in silo 53, such solids being directed for activation aiming at the industrial utilization of same.

A second aspect of the invention is the process for treating multiphase residues having unlimited contents of water, oil and solids.

The process for treating multiphase residues having unlimited contents of water, oil and solids for obtaining hydrocarbons according to the invention comprises the steps of:

a) providing a tubular reactor 40 having a screw conveyor 42 to continuously displace the residue being treated along said tubular reactor 40, said reactor working under the sealed mode and under conditions of reduced pressure and inert gas atmosphere, and being provided with a refractory steel sleeve 41 around which are installed three independent heating zones Z-1, Z-2 and Z-3 with a temperature gradient, residue inlet 43 and product exit 44, said reactor being connected to system 60 for collection of condensed gases produced in each of said heating zones, b) directing via line 12, from a feeding device 11, an amount of residue to be treated to tubular reactor 40 through inlet 43, said residue being then submitted during 15-30 minutes to heating in Zone Z-1 at temperatures from 80° C. on for evaporating free and emulsified water, the light hydrocarbons present being directed to exit 45 via line 61a up to condenser 61;

c) displacing the residual mass from zone Z-1 towards heating zone Z-2 of tubular reactor 40, during a residence time of 10-20 minutes and heating said mass at temperatures from 180° C. on to cause a thermal desorption process and obtain hydrocarbons, directing the so-obtained hydrocarbons being directed through exit 46 up to condenser 62 via line 62a, and obtaining a residual mass containing heavier hydrocarbon fractions and solids;

d) displacing the residual mass obtained in c) containing said heavier fraction towards heating zone Z-3 of the tubular reactor 40, during a residence time around 15-30 minutes, said mass being then submitted to mild pyrolysis conditions at temperatures from 250° C. on so as to effect partial conversion of said heavier fraction into lower molecular weight hydrocarbon compounds, said compounds being vaporized and directed through exit 47 up to condenser 63 via line 63a, while the solids resulting from the process are directed under an inert atmosphere via line 49 to a collecting system 50;

e) collecting the solids produced in step d) by opening upper valve 51 of collecting device or silo 53 while the lower valve 52 is kept closed;

f) recovering the solids collected in step e), closing upper valve 51 while the pressure of silo 52 is increased with the aid of inert gas injection via the inert gas system 20 connected to silo 53 via line 22, and opening lower valve 52;

g) post-treating by activation the solids recovered in f) for industrial utilization.

The resulting hydrocarbon collected in condensers 61, 62, and 63 is separated in decanters (not represented), obtaining hydrocarbons the water content of which is between 0.30 and 0.50% vol/vol.

The water recovered by evaporation and as reaction water collected in system 60 of condensers 61, 62 and 63 is analyzed and can be a source of useful products such as ammonia, metals, etc.

The inventive system and process associated to it represent an economically viable alternative to the present process for treating municipal waste in solid form, such process requiring huge amounts of energy for drying the water present in the waste. The present system on the contrary can handle municipal wastes having as low as 15% w/w solids, this greatly reducing the energy expenditure for water evaporation.

One important advantageous feature of the present system and process is that it is environmentally friendly. Such advantage is consequent to the fact that not only many kinds of organic or petroleum residues will no longer occupy huge landfarming areas, where the biological degradation is rather slow, but also, useful products resulting from the working of the multiphase residue processing will contribute to lower the cost of the system and process.

Besides, the water associated to the residue as well as reaction water are fully utilized, the final discarded water being environmentally friendly.

Utilization of the solid residue is a further advantage, from the environmental as well as economic point of view, said residue being designed to several industrial uses.

Thus, the process herein described and claimed can be considered as an integrated process in its several steps, contemplating the treatment of a raw material that is at first sight a problem and becomes a source of a series of products, from hydrocarbons up to dissolved substances in the separated water, and utilization of the final solid residue.

A further feature of the inventive process made viable by the proposed system, is its extreme versatility, since multiphase residues as varied as municipal waste, bay bottom mud, used tires, bottom tanks and API separator petroleum sludge, oil spills on sea water and soils, organic wastes from leather factories and slaughterhouses of poultry and cattle, wastes from the pulp and paper industry, mining, chemical and pharmaceutical wastes can be admitted into the system, besides making possible to recover phenols from foundry sands.

A further patentably distinguishing feature of the invention is the economic aspect. The Applicant has conducted a Technical and Economic Viability Study for the present system, which revealed that it is entirely viable from an economic point of view, this feature being absent from technologies using dried feeds to be submitted to thermal conversion processes.

For this study, a residue or waste having 27% solids, 18% solids and 48% water and 6.3% gas was used. Several economic parameters were considered in the study such as operation costs, investment costs and others. The cost of a barrel of oil was fixed at US 42.00. Average cost of labor considering 6 working people US 1,000.00.

Cost of comparative technologies such as plasma or encapsulation are estimated at US 150.00 per ton.

For evaluating cost and performance of the system, a 500 kg/hour equipment is taken as standard, at an 85% useful working rate with the solids being disposed off without any cost.

Maintenance costs, electricity and manpower considered as a whole lead to the conclusion that oil is recovered with surplus revenue.

In summary, the present system and process, for the conditions set forth above, represents an annual income of nearly US 1 million, with an internal return ratio of 37-40%.

We claim:

1. A system for the treatment of a multiphase residue of water, oil and solid, for obtaining hydrocarbons and other products, wherein said multiphase residue is a water-containing feed having as low as 15% wt solids, the system comprising:
    (a) a tubular reactor (40), working in a sealed mode under inert atmosphere and vacuum/reduced-pressure, made up of a single chamber having an inner carrier helicoid (42) and three independent sets of heating elements around a refractory steel outer sleeve (41) so as to create three gradient heating zones along said chamber, and in the upper part being provided with three exits (45, 46, 47) for generated gas and a gas inlet (48) while in the lower part being provided with an inlet (43) for feeding the multiphase residue and an exit (44) for generated solids;
    (b) a feed system (10) made up of a positive displacement pump (11) adapted to a hopper (13) for feeding and displacing the multiphase residue in a controlled way via a line (12) towards the chamber, keeping a vertical column filled in to work as a vacuum seal;
    (c) a vacuum/reduced-pressure system (30) made up of a high flow rate vacuum pump able to impart a depression around 400 to 1000 mbar below atmospheric in the system;
    d) an inert gas system (20) for introducing inert gas into the system so as to render inert atmosphere;
    (e) a solids discharge sealed system (50) for produced solids, made up of an upper valve (51) and a lower valve (52) and an intermediate silo (53) connected to the inert gas system (20);
    (f) a gas condensation system (60) for generated gases, made up of three condensers (61, 62, 63) under vacuum and each being connected to each of the three exits (45, 46, 47) of the reactor;
    (g) a scrubbers system (70) for trapping generated gases that leave the gas condensation system (60), made up of three bubbling vessels (71, 72, 73) containing chemical, in series, connected to the vacuum/reduced-press system (30);
    (h) a control system (80) for controlling the process conditions; and
    (i) a post treatment system (90) for the collected solids in the silo (53).

2. A system according to claim 1, wherein said bubble vessels (71, 72, 73) contain chemical products and dispersants designed to selectively trap by chemical reaction non-condensable gases, contaminants or specific compounds produced in said heating zones.

3. A system according to claim 1, wherein the reactor (40), in the upper part, is provided with a residue inlet (43*a*) for feeding a multiphase residue of high solids and low water.

4. A system according to claim 1, wherein the vacuum seal of the reactor (40) is carried out keeping a vertical column filled via lines (12, 12*a*).

5. A system according to claim 1, wherein additionally the sealing is effected by the inert gas added through sealing valves (23) and (24) as well as by the gases generated in the reaction system.

6. A system according to claim 1, wherein the condensers (61, 62, 63) are connected to the exits (45, 46, 47) of the reactor (40) and coupled to a collecting tank storage of the hydrocarbon products.

7. A process for the treatment of a multiphase residue of water, oil and solids for obtaining hydrocarbons and other useful products, in a system defined in claim 1, wherein said process comprises the following steps:
    a) feeding a multiphase residue to be treated into the chamber of reactor (40), by displacement, the residue being then submitted during 15-30 minutes to a first heating zone to temperatures from 80° C. on, for evaporating free and emulsified water, the light hydrocarbons present being directed through an exit (45) up to a condenser (61);
    b) displacing the residual mass from the first heating zone to a second heating zone, the residue being kept for 10-20 minutes, and heating said residual mass at temperatures from 180° C. on, to cause a thermal desorption process, the produced hydrocarbons being directed through an exit (46) up to a condenser (62) obtaining a residual mass containing heavier hydrocarbon fractions and solids;
    c) displacing the residual mass obtained in b) containing said heavier fraction towards a third heating zone of said tubular reactor (40), during a residence time of 15-30 minutes to submit said mass to mild pyrolysis conditions from 250° C. on, so as to effect partial conversion of said heavier hydrocarbon fraction into lower molecular weight hydrocarbon compounds, said compounds being vaporized and directed through an exit (47) up to a condenser (63) while the solids generated are directed under an inert atmosphere to a collecting system (50);
    d) collecting the solids produced in c) by opening an upper valve (51) of silo (53) while a lower valve (52) keeps closed;
    e) recovering the solids collected in d) by closing said upper valve (51) while the pressure of said silo (53) is increased with the aid of inert gas injection via an inert gas system (20) connected to said silo (53) via a line (22), and opening said lower valve (52); and
    f) post-treating by activation the solids recovered in e) for industrial uses.

8. A process according to claim 7, wherein the hydrocarbon fractions collected in said condensers (61, 62, 63) are separated in decanters, yielding hydrocarbons having water content between 0.3 and 0.5 vol/vol.

9. A process according to claim 7, wherein the water separated in decanters is analyzed and the useful products are utilized.

10. A process according to claim 7, wherein the post-treatment system (90) comprises the activation of the solids collected in silo (53) for industrial uses.

11. A process according to claim 7, wherein the multiphase residue is a municipal waste having at least 15% wt/wt solids.

12. A process according to claim 7, wherein the multiphase residue is an industrial residue produced in leather factories and slaughterhouses.

13. A process according to claim 7, wherein the multiphase residue is a petroleum residue.

14. A process according to claim 13, wherein the petroleum residue is produced in an API separator.

15. A process according to claim 13, wherein the petroleum residue is a petroleum sludge.

16. A process according to claim 13, wherein the petroleum residue is an oil from a spill on sea water or on land.

17. A process according to claim 13, wherein the petroleum residue is from petroleum oil or related products storage tank bottoms.

18. A process according to claim 7, wherein the multiphase residue is an admixture in any amount of organic residues and petroleum residues.

19. A process according to claim 7, wherein the multiphase residue comprises used tires.

20. A process according to claim 7, wherein the multiphase residue is a residue from the dredging of bay bottoms and landfarms.

21. A process according to claim 7, wherein the multiphase residue is produced by a paper and pulp industry.

22. A process according to claim 7, wherein the multiphase residue is produced by a mining industry.

23. A process according to claim 7, wherein the multiphase residue is produced by chemical and pharmaceutical industries.

24. A process according to claim 7, wherein the multiphase residue is produced by a foundry sand from which the phenols are recovered.

* * * * *